United States Patent [19]
Nakamura et al.

[11] Patent Number: 6,114,411
[45] Date of Patent: Sep. 5, 2000

[54] INK COMPOSITION FOR INK JET RECORDING AND INK JET RECORDING PROCESS

[75] Inventors: Hiroto Nakamura; Michinari Tsukahara; Hideo Yamazaki; Hidehiko Komatsu; Yoshiyuki Ozawa; Kazutoshi Fujisawa; Kenichi Kanbayashi, all of Nagano, Japan

[73] Assignee: Seiko Epson Corporation, Tokyo, Japan

[21] Appl. No.: 08/726,660

[22] Filed: Oct. 7, 1996

[30] Foreign Application Priority Data

| | | | |
|---|---|---|---|
| Oct. 6, 1995 | [JP] | Japan | 7-260588 |
| Oct. 25, 1995 | [JP] | Japan | 7-278155 |
| Oct. 25, 1995 | [JP] | Japan | 7-278157 |
| Oct. 25, 1995 | [JP] | Japan | 7-278158 |
| Feb. 2, 1996 | [JP] | Japan | 8-017841 |

[51] Int. Cl.$^7$ .................................................. C09D 5/00
[52] U.S. Cl. ...................................... 523/161; 524/58
[58] Field of Search ................................ 523/161; 524/58

[56] References Cited

U.S. PATENT DOCUMENTS

5,302,197  4/1994  Wickramanayke ........................ 106/22

FOREIGN PATENT DOCUMENTS

| | | | |
|---|---|---|---|
| 53-61412 | 6/1978 | Japan | C09D 11/00 |
| 58-188684 | 11/1983 | Japan | B41J 27/00 |
| 60-209210 | 10/1985 | Japan | B01D 19/00 |
| 60-209212 | 10/1985 | Japan | B01D 19/00 |
| 62-1426 | 1/1987 | Japan | C09D 11/00 |
| 62-288042 | 12/1987 | Japan | B41J 3/04 |
| 1-204979 | 8/1989 | Japan | C09D 11/00 |
| 2-255875 | 10/1990 | Japan | C09D 11/00 |
| 3-56573 | 3/1991 | Japan | C09D 11/00 |
| 3-79678 | 4/1991 | Japan | C09D 11/00 |
| 3-160068 | 7/1991 | Japan | C09D 11/00 |
| 4-18462 | 1/1992 | Japan | C09D 11/00 |
| 5-148441 | 6/1993 | Japan | C09D 11/02 |
| 5-320549 | 12/1993 | Japan | C09D 11/00 |
| 6-116522 | 4/1994 | Japan | C09D 11/00 |

*Primary Examiner*—Edward J. Cain
*Attorney, Agent, or Firm*—Sughrue, Mion, Zinn, Macpeak & Seas, PLLC

[57] ABSTRACT

An ink composition for ink jet recording is described comprising a pigment, a resin dispersant, a thermoplastic resin emulsion and water, wherein the weight ratio of the pigment to the resin dispersant is from 20:1 to 5:2. The foregoing ink composition is little susceptible to irregular bleeding on a recording medium, undergoes no change in physical properties and jettability and no precipitation of solid matter and exhibits an excellent redispersibility.

2 Claims, 3 Drawing Sheets

SATURATED AMOUNT OF DISSOLVED AIR IN WATER

INK COMPOSITION FOR INK JET RECORDING AND INK JET RECORDING PROCESS

BACKGROUND OF THE INVENTION

1. Field of the Invention

The present invention relates to an ink composition for ink jet recording and an ink jet recording process. In other words, the present invention relates to an ink composition for an ink jet printer which jets an ink droplet through an ink jet recording head to form an ink image on a recording medium such as recording paper and cotton or silk fiber. More particularly, the present invention relates to an ink composition for color ink jet printer and an ink jet recording process using said ink composition.

2. Description of the Related Art

An ink composition for ink jet recording normally must meet the following requirements:

(1) It must be little susceptible to irregular bleeding on a recording medium; and (2) It must undergo no change in physical properties and jettability and show no precipitation of solid matter.

In particular, the elimination of bleeding is important in the printing of color image. In color printing, a plurality of color ink compositions are printed on the same recording medium. In order to obtain a color print free of unevenly color area, it is necessary that the color border in the image be definite. To this end, the mixing of ink compositions in this area must be prevented.

In order to realize printing free of bleeding, various proposals have been heretofore made. For example, JP-A-58-188684 (The term "JP-A" as used herein means an "unexamined published Japanese patent application") and JP-A-62-288042 disclose a method which comprises printing while heating a recording medium. However, these patents don't disclose the use of an ink composition containing a thermoplastic resin.

In recent years, a pigment-based ink composition has been researched and developed for the purpose of realizing print free of bleeding as well as enhancing light resistance and weather resistance of image. For example, JP-A-6-116522 discloses an ink composition comprising a base composed of a water-soluble resin, a water-soluble solvent, a pigment and water having a specific additive incorporated therein. However, the ink composition disclosed in the foregoing patent is disadvantageous in that it causes clogging in the ink jet head. Thus, this ink composition cannot be applied to a recording system which comprises fixing simultaneously with the arrival of an ink composition to a heated recording medium. Further, JP-B-62-1426 (The term "JP-B" as used herein means an "examined Japanese patent publication"), JP-A-2-255875 and JP-A-4-18462 report an ink which comprises as ingredients water, a pigment and a resin emulsion to solve the problems of water resistance and light resistance as well as eliminate ink bleeding, which has been a problem with conventional dye-based inks.

When an ink composition comprising a thermoplastic resin is subjected to ink jet recording so that it is attached to a recording medium which is then heated to a temperature of not lower than a specific value, print bleeding can be well inhibited. It goes without saying that an ink composition for use in this recording process preferably undergoes no change in physical properties and jettability and shows no precipitation of solid matter during storage. Further, since this recording method requires the use of heat, the ink composition can be dried and solidified on the nozzle plate.

Further, if the ink composition used is a pigment-based ink composition having a great solid content, there arise the following two major problems attributable to this cause.

The first problem is that the ink composition may solidify in an ink passage from a normally sealed ink tank to an ink jet head due to some accident, possibly causing clogging in the recording head.

The second problem is that if the ink composition is attached to and dried on the plate having recording head nozzles arranged thereon and it cannot be rapidly removed by the cleaning operation of the recording apparatus, it may cause malinjection (deflected fly) of the ink composition during printing.

SUMMARY OF THE INVENTION

The inventors made a further research and development of an ink composition suitable for use in an ink jet recording system which comprises attaching an ink composition containing a pigment and a thermoplastic resin to a recording medium, and then heating the recording medium to not lower than a predetermined temperature. As a result, it was found that the predetermination of the proportion of the pigment and the dispersant for the pigment to a specified range makes it possible to obtain an ink composition having an excellent redispersibility which is less susceptible to bleeding of printed ink and shows no change of physical properties and jettability and undergoes no precipitation of solid content even after a prolonged storage.

It is therefore an object of the present invention to provide an ink composition containing a pigment and a thermoplastic resin which can be best used in a system comprising the heating of a recording medium to not lower than a predetermined temperature without causing the bleeding of printed ink.

It is another object of the present invention to provide an ink composition which shows no change or physical properties and jettability and undergoes no precipitation of solid content even after a prolonged storage.

It is a further object of the present invention to provide an ink composition for ink jet recording which allows a solid matter produced by drying or the like in an ink passage or a plate having recording head nozzles arranged therein to be redispersed immediately upon contact with the ink composition which has been newly supplied by the time when the ink composition is heated to not lower than a predetermined temperature so that it is fixed on the recording medium.

Other objects and effects of the present invention will become more apparent from the following description.

The present invention concerns an ink composition for ink jet recording comprising a pigment, a resin dispersant, a thermoplastic resin emulsion and water, wherein the weight ratio of said pigment to said resin dispersant is from 20:1 to 5:2.

The present invention further concerns an ink jet recording process which comprises jetting droplets of the foregoing ink composition through an ink jet recording head so that said droplets are attached to a recording medium, and applying heat to said droplets of ink composition from a recording medium support (e.g., platen) via the recording medium at the same time with the attachment of the ink droplets so that said droplets of ink composition are fixed.

DETAILED DESCRIPTION OF THE PREFERRED EMBODIMENTS

Figure 1:
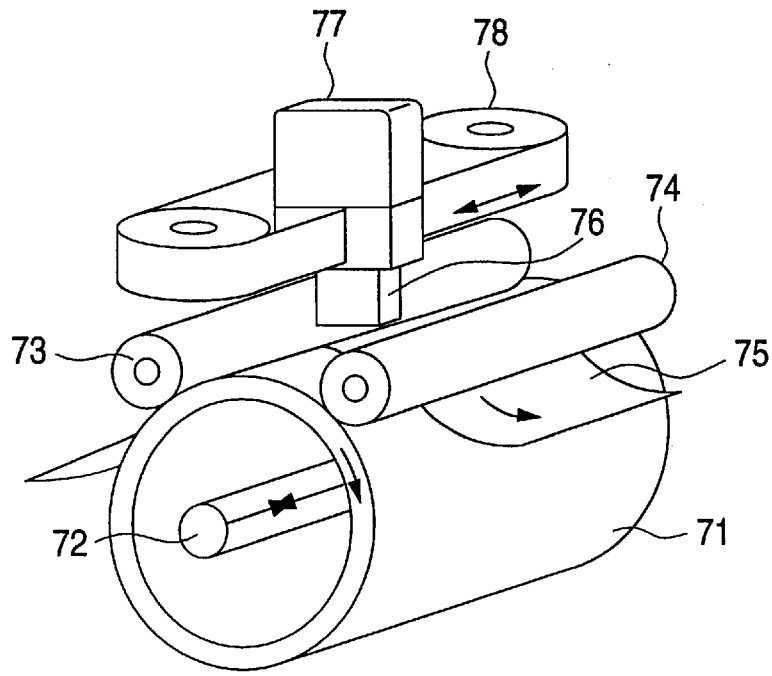
FIG. 1 is a schematic perspective view illustrating an ink jet recording apparatus used in the evaluation of the ink composition for ink jet recording of the present invention.

The ink composition for ink jet recording of the present invention comprises as essential ingredients at least a pigment, a resin dispersant, a thermoplastic resin emulsion and water incorporated therein.

The ink composition of the present invention may comprise as a pigment an organic or inorganic pigment such as those which have heretofore been used for ink composition for ink jet recording. Examples of the inorganic pigment employable herein include titanium oxide, iron oxide, and carbon black prepared by a known method such as contact method, furnace method and thermal method. Examples of the organic pigment employable herein include azo pigment (e.g., azo lake, insoluble azo pigment, condensed azo pigment, chelate azo pigment), polycyclic pigment (e.g., phthalocyanine pigment, perylene pigment, perinone pigment, anthraquinone pigment, quinacridone pigment, dioxazine pigment, thioindigo pigment, isoindolinone pigment, quinophthalon pigment), dye chelate (e.g., basic dye type chelate, acidic dye type chelate), nitro pigment, nitroso pigment, and aniline black. Preferred among these pigments are those having a good affinity for water.

Specific examples of pigment for black ink include carbon black (C.I. pigment black 7) such as furnace black, lamp black, acetylene black and channel black, metal compound such as copper oxide, iron oxide (C.I. pigment black 11) and titanium oxide, and organic pigment such as aniline black (C.I. pigment black 1).

Specific examples of pigment for color ink include C.I. pigment yellow 1 (fast yellow G), 3, 12 (disazo yellow AAA), 13, 14, 17, 23, 24, 34, 35, 37, 42 (yellow iron oxide), 53, 55, 81, 83 (disazo yellow HR), 95, 97, 98, 100, 101, 104, 108, 109, 110, 117, 120, 138, 153; C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, 219; and C.I. pigment blue 1, 2, 15 (phthalocyanine blue R), 15:1, 15:2, 15:3 (phthalocyanine blue G), 15:4, 15:6 (phthalocyanine blue E), 16, 17:1, 56, 60, 63. These pigments may be used singly or in combination. The ink composition of the present invention comprises a pigment incorporated therein. Accordingly, the ink composition of the present invention is insusceptible to deterioration of physical properties due to the decomposition of a dye during storage which would occur with an ink composition comprising a dye. Further, the ink composition of the present invention is insusceptible to change of jettability and clogging in the jet nozzle attributed to the deterioration of physical properties.

The content of the foregoing pigment is preferably from 0.1 to 10% by weight, more preferably from 0.5 to 5% by weight based on the total weight of the ink composition. By predetermining the lower limit of the content of the pigment to 0.1% by weight, a sufficient print density can be secured. By predetermining the upper limit of the content of the pigment to 10% by weight, an even higher jetting stability can be secured without causing any structural viscosity in the viscosity of the ink composition. Further, by further predetermining the content of the pigment to a range of from 0.5 to 5% by weight, the durability of jetting stability can be particularly enhanced.

The grain diameter of the foregoing pigment is not specifically limited. The grain diameter (average grain diameter) of the pigment is preferably not more than 25 $\mu$m, more preferably not more than 1 $\mu$m. If a pigment having a grain diameter of not more than 25 $\mu$m is used, clogging can be inhibited, realizing an even higher jetting stability.

The ink composition of the present invention comprises a resin dispersant which can dispersibly stabilize the foregoing pigment in the ink composition in the form of fine grain. Specific examples of the resin dispersant employable herein include a copolymer resin having a hydrophilic moiety and a hydrophobic moiety in its molecule such as acrylic dispersant (e.g., styrene-acrylic acid copolymer, styrene-acrylic acid-acrylic acid ester copolymer, styrene-methacrylic acid copolymer, styrene-methacrylic acid-acrylic acid ester copolymer), maleic dispersant (e.g., styrene-maleic acid copolymer, acrylic acid ester-maleic acid copolymer, styrene-acrylic acid ester-maleic acid copolymer), sulfonic dispersant (e.g., acrylic acid ester-styrenesulfonic acid copolymer, styrene-methacrylsulfonic acid copolymer, acrylic acid ester-allylsulfonic acid copolymer), and salt thereof. A copolymer resin, particularly a styreneacrylic acid copolymer resin, having a weight-average molecular weight (hereinafter referred to as "molecular weight") of from 1,600 to 25,000 and an acid value of from 100 to 250 is preferably used. If a copolymer resin, particularly a styreneacrylic acid copolymer resin, having a molecular weight and an acid value deviating from the above defined range is used, the resulting ink composition may undergo the agglomeration of the pigment after a prolonged storage, occasionally making it impossible to secure a sufficient storage stability.

The foregoing resin dispersant can be prepared by a known method (e.g., bulk polymerization, solution polymerization) per se. A commercial resin dispersant may be used. Examples of such a commercial resin dispersant include Joncryl 68 (molecular weight: 10,000; acid value: 195), Joncryl 679 (molecular weight: 7,000; acid value: 200), Joncryl 680 (molecular weight: 39,000; acid value: 215), Joncryl 682 (molecular weight: 1,600; acid value: 235), Joncryl 550 (molecular weight: 7,500; acid value: 200), Joncryl 555 (molecular weight: 5,000; acid value: 200), Joncryl 586 (molecular weight: 3,100; acid value: 105), Joncryl 683 (molecular weight: 7,300; acid value: 150) and B-36 (molecular weight: 6,800; acid value: 250), available from Jonson Polymer Corporation.

In the ink composition of the present invention, the weight ratio of the foregoing pigment to the foregoing resin dispersant (pigment:resin dispersant) is from 20:1 to 5:2.

If the content of the resin dispersant falls below the above defined range, the resulting ink composition shows a deterioration of dispersion stability of pigment with time as it is allowed to stand. As a result, the ink composition undergoes agglomeration and shows deterioration of viscosity characteristics. If the content of the resin dispersant exceeds the above defined range, a redispersibility required for the drying of the ink composition cannot be obtained.

In order to dissolve the foregoing resin dispersant in the aqueous ink composition of the present invention, it is preferred that an acid group (e.g., acrylic acid group) contained in the resin dispersant form a salt with counter ions. The compound which can be used for this purpose is not specifically limited so far as it is a base capable of forming a salt with a carboxyl group. Examples of such a compound include organic amine such as primary amine, secondary amine, tertiary amine and quaterized amine, aminoalcohol compound such as aminomethylpropanol, 2-aminoisopropanol and triethanolamine, cyclic amine such as morpholine, and inorganic base such as aqueous ammonia. The content of the base is preferably not less than the neutralization equivalent, more preferably about 1.3 times the neutralization equivalent from the standpoint of fixability after printing.

Further, a glycol such as propylene glycol and/or monovalent alcohol such as isopropanol may be used as a dissolving aid for resin dispersant.

In order to facilitate the ionic dissociation of the salt in the dispersant thus obtained, it is preferred that the ink composition of the present invention comprise a pH buffer incorporated therein to adjust the pH value thereof to a proper value, providing the dispersant with a good dissolution stability. The pH buffer is not specifically limited so far as it can control the pH value of the ink composition to a range of from 7 to 10. Specific examples of such a pH buffer include potassium hydrogen phthalate, potassium dihydrogenphosphate, sodium dihydrogenphosphate, sodium tetraborate, potassium hydrogen tartrate, sodium hydrogencarbonate, sodium carbonate, tris(hydroxymethyl) aminomethane, and tris(hydroxymethyl)aminomethane hydrochloride. The content of the pH buffer is preferably such that the pH value of the ink composition is from about 7 to 10 from the standpoint of the durability of head members and the stability of the ink composition.

The ink composition of the present invention comprises a thermoplastic resin emulsion incorporated therein. The thermoplastic resin emulsion comprises a thermoplastic resin dispersed in an aqueous medium.

As the thermoplastic resin component constituting the foregoing thermoplastic resin emulsion there may be used the same thermoplastic resin component as used in thermoplastic resin emulsions which have heretofore been used in ink composition for ink jet recording. Specific examples of such a thermoplastic resin include acrylic polymer such as polyacrylic acid ester, copolymer thereof, polymethacrylic acid ester, copolymer thereof, polyacrylonitrile, copolymer thereof, polyacrylamide, polyacrylic acid and polymethacrylic acid; polyolefinic polymer such as polyethylene, polystyrene and copolymer thereof; vinyl acetate polymer or vinyl acetate copolymer such as polyvinyl acetate, copolymer thereof and polyvinyl acetal; polyvinyl chloride, copolymer thereof, polyvinylidene chloride, fluororesin, polychloroprene, and natural high molecular resin. Particularly preferred examples of these thermoplastic resins include styrene-acrylic acid ester copolymer, polyacrylic acid ester, polymethacrylic acid ester, polystyrene, polyethylacrylic acid ester, styrene-butadiene copolymer, butadiene copolymer, acrylonitrile-butadiene copolymer, chloroprene copolymer, crosslinked acrylic resin, crosslinked styrene resin, fluororesin, vinylidene fluoride, benzoguanamine resin, polyolefin resin, styrene-methacrylic acid ester copolymer, polystyrene, styrene-acrylamide copolymer, n-isobutyl acrylate, acrylonitrile, vinyl acetate, acrylamide, polyvinyl acetal, rosin, polyethylene, vinylidene chloride resin, vinyl acetate, ethylene-vinyl acetate copolymer, vinyl acetate-acryl copolymer, and vinyl chloride resin.

The thermoplastic resin component constituting the thermoplastic resin emulsion to be incorporated in the ink composition of the present invention preferably has a softening/melting temperature of from 50° C. to 150° C., more preferably from 60° C. to 100° C. The term "softening/melting temperature" as used herein indicates the lowest among the glass transition point, melting point, softening point and lowest film-forming temperature (MFT) of the thermoplastic resin and the temperature at which the viscosity coefficient of the thermoplastic resin is from $10^{11}$ to $10^{12}$ poise.

It is generally said that the ink jet recording process is inferior to electrophotographic printer in fixability to a recording medium (water resistance, and/or scratch resistance. However, the use of the ink composition of the present invention comprising the foregoing thermoplastic resin emulsion in ink jet recording can provide a higher fixability than the use of conventional ink compositions in ink jet recording. In other words, the fixing of printed ink in the ink jet recording process with the ink composition of the present invention is effected at a temperature of higher than the softening/melting temperature of the resin component in the thermoplastic resin emulsion in the recording apparatus. The platen temperature during this process is such that a sufficient fixing strength can be provided with respect to the recording medium [temperature of not lower than the lowest film-forming temperature (MFT) and high enough to dry the ink composition solvent], taking into account possible clogging in the ink composition jetting head. The fixing of the ink composition by the film-formation of the thermoplastic resin component gives a sufficient strength with respect to the recording medium. Therefore, the ink composition fixed on the recording medium by heat energy exhibits a sufficient print fastness such as water resistance and scratch resistance.

The thermoplastic resin emulsion to be incorporated in the ink composition of the present invention can be prepared by a known method per se (e.g., emulsion polymerization). Alternatively, a known or commercial resin dispersant may be used. For example, as a thermoplastic resin emulsion there may be used a resin emulsion as described in JP-B-62-1426, JP-A-3-56573, JP-A-3-79678, JP-A-3-160068, and JP-A-4-18462. Examples of the commercial resin emulsion employable herein include Microgel E-1002, E-2002, E-5002 (styrene acryl resin emulsion, available from Nippon Paint Co., Ltd.), Voncoat 4001 (acryl emulsion, available from Dainippon Ink & Chemicals, Inc.), Voncoat 5454 (styrene acryl resin emulsion, available from Dainippon Ink & Chemicals, Inc.), SAE 1014 (styrene acryl resin emulsion, available from Nippon Zeon Co., Ltd.), Saivinol SK-200 (acryl resin emulsion, available from Saiden Chemical Industry Co., Ltd.), Nanocryl SBCX-2821 (silicone-modified acryl resin emulsion, available from Toyo Ink Mfg. Co., Ltd.), Nanocryl SBCX-3689 (silicone-modified acryl resin emulsion, available from Toyo Ink Mfg. Co., Ltd.), #3070 (methacrylic acid methyl polymer resin emulsion, available from Mikuni Color Limited), SG-60 (styrene-acryl resin emulsion, available from Gifu Ceramic Co., Ltd.), and Grandol PP-1000 (Styrene-acryl resin emulsion, available from Dainippon Ink & Chemicals, Inc.).

The proportion of water to the resin component (disperse phase) in the thermoplastic resin emulsion is preferably from 60 to 400 parts by weight, more preferably from 100 to 200 parts by weight based on 100 parts by weight of the resin component.

In order to keep the thermoplastic resin emulsion stable in dispersion similarly to the pigment, it is preferred that the pH value of the ink composition be adjusted to an optimum range (preferably from 7 to 10, more preferably from 7.5 to 9). Accordingly, in order lo keep both the pigment and the thermoplastic resin emulsion stable in dispersion, it is preferred that the pH value of the ink composition be adjusted to an optimum range for both the two components (preferably from 7 to 10, more preferably from 7.5 to 9).

The content of the foregoing thermoplastic resin component is preferably from 0.2 to 20% by weight, more preferably from 7 to 20% by weight based on the total weight of the ink composition. The predetermination of the lower limit of the content of the thermoplastic resin component to 0.2% by weight makes it possible to secure an even better print quality. On the other hand, the predetermination of the upper limit of the content of the thermoplastic resin component to 20% by weight makes it possible to control the viscosity of the ink composition to a proper value.

The ink composition of the present invention comprises water as a main solvent. Heretofore, as an ink composition solvent there has been mainly used water because water has a low viscosity, an excellent safety, a good handleability and is inexpensive and odorless. Examples of the water for ink composition include pure or ultrapure water such as ion-exchanged water, ultrafiltrated water, water which has been subjected to reverse osmosis and distilled water. Further, water which has been sterilized by the irradiation with ultraviolet rays or by the addition of hydrogen peroxide is preferably used to inhibit the generation of mold or bacteria during a prolonged storage.

The ink composition for ink jet recording of the present invention may further comprise saccharides incorporated therein. The incorporation of saccharides thickens the ink composition and provides the ink composition with moisture retention. The weight ratio of the saccharides to the foregoing thermoplastic resin component in the emulsion (saccharides/thermoplastic resin component) is preferably not more than 2/1, more preferably 1/5 to 1.

Examples of the saccharides include monocsaccharides such as glucose, xylose and arabinose, disaccharides such as saccharose and maltose, polysaccharides such as maltotriitol and starch, and sugar derivatives such as maltitol and oligosaccharide alcohol.

The ink composition for ink jet recording of the present invention may comprise a nonionic surface active agent having a polyoxyethylene group in its molecular skeleton. The incorporation of such a nonionic surface active agent makes it possible to provide printed ink with excellent water resistance, scratch resistance, marker resistance and aqueous scratch resistance. The content of the nonionic surface active agent is preferably not more than 12% by weight, more preferably from 0.05 to 10% by weight based on the total weight of the ink composition. If the content of the nonionic surface active agent exceeds 12% by weight, the resulting ink composition foams violently. On the contrary, if the content of the nonionic surface active agent falls below 0.05% by weight, the ink composition can insufficiently extend on the recording medium.

As the nonionic surface active agent having a polyoxyethylene group in its molecular skeleton there may be used a nonionic surface active agent having an HLB value of not less than 13. As such a nonionic surface active agent having an HLB value of not less than 13 there may be preferably used polyoxyethylene adduct of acetylene glycol, alcohol ethylene oxide, polyoxyethylene alkyl ether, polyoxyethylene alkyl phenol ether, polyoxyethylene polystyl phenyl ether, polyoxyethylene polyoxy propylene glycol, polyoxyethylene-polyol propylene alkyl ether, polyoxyethylene polyvalent alcohol aliphatic acid partial ester, polyoxyethylene aliphatic acid ester, polyglycerin aliphatic acid ester, polyoxyethylenated castor oil, polyoxyethylene alkylamine or polyoxyethylene sorbitan aliphatic acid ester from the standpoint of print fastness. These nonionic surface active agents may be used singly or in combination.

The ink composition for ink jet recording or the present invention may comprise an anionic surface active agent having a polyoxyethylene group in its molecular skeleton. The incorporation of such an anionic surface active agent makes it possible to provide an ink composition having an excellent jetting stability and provide printed ink with an excellent scratch resistance or water resistance. The content of the anionic surface active agent is preferably not more than 12% by weight, more preferably from 0.05 to 10% by weight based on the total weight of the ink composition. If the content of the anionic surface active agent exceeds 12% by weight, the resulting ink composition foams violently. On the contrary, if the content of the anionic surface active agent falls below 0.05% by weight, the ink composition can insufficiently extend on the recording medium.

Examples of the anionic surface active agent having a polyoxyethylene group in its molecular skeleton include polyoxyethylene alkyl ether sulfate, polyoxyethylene alkyl phenyl ether sulfate, polyoxyethylenestyrenated phenyl ether sulfate, polyoxyethylene alkyl ether phosphate, and polyoxyethylene alkyl phenyl ether phosphate. Particularly preferred among these anionic surface active agents are polyoxyethylene alkyl ether sulfate, and polyoxyethylene alkyl phenyl ether sulfate. The foregoing salts may be preferably in the form of potassium salt, sodium salt, ammonium salt, monoethanolamine salt or diethanolamine salt, particularly ammonium salt. These anionic surface active agents may be used singly or in combination. In each of the compounds listed above as anionic surface active agent, the degree of polymerization of polyoxyethylene group is preferably from 3 to 10, and the alkyl group preferably has from 1 to 17 carbon atoms.

Further, the ink composition of the present invention may comprise a nonionic surface active agent having a polyoxyethylene group in its molecular skeleton and an anionic surface active agent in its molecular skeleton at the same time. In this case, referring to the sum of the content of the two types of surface active agents, the weight ratio of nonionic surface active agent to anionic surface active agent is preferably from 1/10 to 1. The incorporation of the two types of surface active agents makes it possible to secure sufficient extension of the ink composition over the recording medium while controlling foaming.

The ink composition according to the present invention may comprise a hydrophilic high boiling low volatility solvent (water-soluble organic solvent) incorporated therein. The incorporation of such a hydrophilic high boiling low volatility solvent makes it possible to enhance anti-nozzle clogging properties, moisture resistance and/or dispersion stability.

Specific examples of such a hydrophilic high boiling low volatility solvent include high boiling low volatility polyvalent alcohol such as glycerin, ethylene glycol, diethylene glycol, triethylene glycol, propylene glycol, dipropylene glycol, hexylene glycol, polyethylene glycol and polypropylene glycol, monoetherification, dietherification or esterification product thereof, such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether, and nitrogen-containing organic solvent such as N-methyl-2-pyrrolidone, 1,3-dimethylimidazolidinone, monoethanolamine, N,N-dimethylethanolamine, N,N-diethylethanolamine, diethanolamine, N-n-butyldiethanolamine, triisopropanolamine, and triethanolamine. Such a hydrophilic high boiling low volatility solvent may be incorporated in the ink composition of the present invention in such an amount that the printed ink cannot bleed.

For the purpose of enhancing the dryability of the ink composition with respect to water as a main solvent, the ink composition may comprise a highly volatile monovalent alcohol such as ethanol, propanol, isopropanol and butanol incorporated therein only in a small amount.

In accordance with a preferred embodiment of the present invention, the predetermination to not more than 14 ppm of the content of dissolved air in the foregoing ink composition for ink jet recording of the present invention suitable for use in a heating type ink jet recording apparatus which operates to jet droplets of ink composition through an ink jet recording head onto a recording medium so that it is attached to a recording medium and then apply heat to said droplets of ink composition from a platen via the recording medium at the same time with the attachment of the ink droplets so that said droplets of ink composition are fixed makes it possible to provide an ink composition for ink jet recording which can be easily prepared and can meet both the requirements for jetting stability in the foregoing heating type ink jet recording apparatus and long-term storage stability at the same time.

When bubbles occur in the ink composition for ink jet recording, malinjection can occur. Further, air dissolved in the ink composition can react with components in the ink composition to cause problems during prolonged storage. Thus, various deaeration or defoaming methods have been proposed for removing from the ink composition dissolved air.

For example, JP-A-5-320549 describes a method which comprises bringing a gas such as nitrogen and helium into contact with an ink composition under a low pressure. This method allegedly provides an ink composition free of dissolved oxygen. Further, JP-A-53-61412 proposes incorporating an oxygen absorbent in an ink composition to prepare an ink composition free of dissolved oxygen. Moreover, JP-A-59-65664 describes a technique which comprises spraying an ink composition into a low pressure vessel to produce a pressure variation by which the ink composition can be completely deaerated. Further, JP-A-59-65665 describes a technique which comprises heating an ink composition, and then deaerating the ink composition in vacuo to realize the complete deaeration of the ink composition.

The ink composition which has been freed of oxygen to inhibit the deterioration of the components in the ink composition by oxidation reaction and hence enhance the long-term storability thereof is disadvantageous in that residual dissolved nitrogen bubbles due to the change of temperature or pressure to cause malinjection. This disadvantage becomes remarkable with the heating type ink jet recording apparatus, which is subject to the exposure of the printing head to high temperatures. Further, the ink composition which has been completely deaerated to inhibit malinjection or enhance the long-term storability thereof is disadvantageous in that the production of the ink composition requires a high degree of vacuum or a high temperature, adding to the production cost.

The inventors have found that the adjustment of the content of air dissolved in the ink composition, i.e., the sum of oxygen and nitrogen dissolved in the ink composition makes it possible to obtain an ink composition for ink jet recording which can be easily prepared and can meet both the requirements for jetting stability in the foregoing heating type ink jet recording apparatus and long-term storage stability at the same time.

If air is dissolved in a dye-based ink composition, the air component can react with components in the ink composition to cause a change of physical properties such as viscosity and surface tension or produce agglomerates, resulting in the deterioration of the ink composition. In particular, oxygen dissolved in the ink composition tends to oxidize the dye component in the ink composition to produce a change of color density or hue. Accordingly, it is essential that dissolved air, particularly dissolved oxygen, be removed from the dye-based ink composition. A pigment has a higher stability than a dye. Thus, the use of a pigment as a coloring agent makes it possible to prepare an ink composition which is less subject to change of density or hue due to dissolved oxygen. Accordingly, it is said that a pigment-based ink composition doesn't need to be completely freed of dissolved air.

However, the ink composition for ink jet recording is jetted in the form of droplet when subjected to mechanical pressure or pressure developed by the vaporization and thermal expansion of the components in the ink composition. If bubbles are present in the ink composition during this process, they absorb the jetting pressure to cause malinjection.

Accordingly, in order to prevent foaming also in the ink composition for ink jet recording, the following care must be taken.

Figure 3:
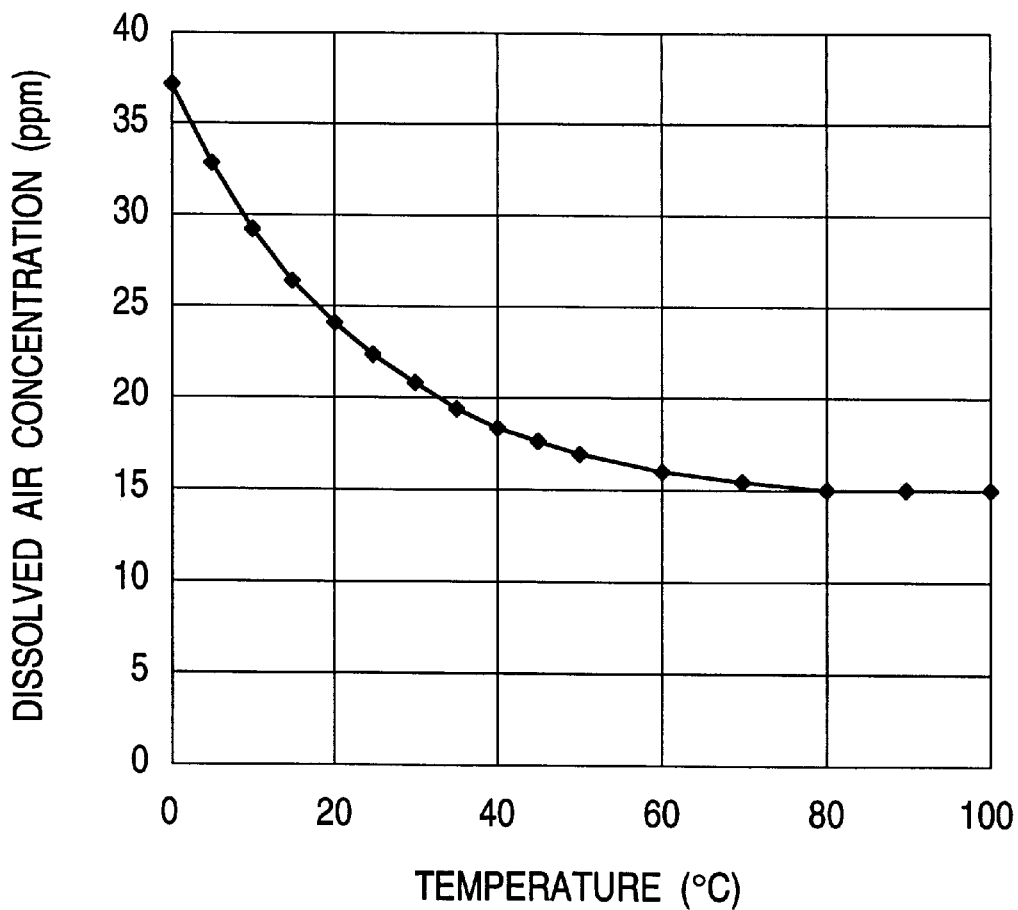
FIG. 3 is a graph illustrating the saturated dissolved air in water at various temperatures.

Since the saturated dissolved amount of air in water decreases as the temperature rises as shown in FIG. 3, air dissolved in the ink composition cannot remain dissolved therein too much as the temperature of the ink composition rises, causing bubbling. Thus, the amount of air dissolved in the ink composition must be controlled low taking into account the possible rise in the temperature of the head.

In an ordinary ink jet printer free of heating system, for example, it can be well expected that the change of the ambient temperature or the like causes the head temperature to rise to about 35° C. In order to prevent bubbling at that time, the amount of air dissolved in the ink composition must be controlled to not more than the saturated dissolved amount of air in the ink composition at 35° C. (18 ppm). Further, in order to enhance the fixability of the ink composition or inhibit the bleeding of printed ink composition, the amount of air dissolved in the ink composition must be controlled even lower in the case of recording system comprising heating a recording medium during printing, which system requires heating the head even higher. For example, if the head temperature is raised to 80° C. or 100° C., the amount of air dissolved in the ink composition must be controlled to not more than 14 ppm. In other words, the adjustment of the amount of air dissolved in the ink composition to not more than 14 ppm makes it possible to obtain an ink composition which undergoes no bubbling even in the heating type ink jet recording system.

The method for controlling the amount of air dissolved in the ink composition to not more than 14 ppm is not specifically limited. For example, an ink composition which has been prepared by an ordinary method can be brought into contact with lean air in a sealed vessel to control the amount of air dissolved in the ink composition. The pressure of lean air, i.e., degree of reduced pressure is preferably not more than 200 mmHg, more preferably from 5 to 100 mmHg. If the pressure of lean air exceeds 200 mmHg, the dissolved air cannot be removed too much. The lower limit of the pressure of lean air is not specifically limited. However, if the pressure of lean air falls below 5 mmHg, the cost is disadvantageously too high. While the ink composition is brought into contact with lean air, it can be heated to a temperature of preferably from 20° C. to 60° C., more preferably from 30° C. to 50° C. to effect efficient removal of dissolved air. The time during which the ink composition is brought into contact with lean air is not specifically limited. By measuring the amount of dissolved air through gas chromatography, one can judge that the amount of dissolved air reaches a predetermined value.

In accordance with another preferred embodiment of the present invention, an ink composition for ink jet recording can be provided, comprising:
(a) a component which stays nonvolatile at the heating temperature of a recording medium in an amount of not less than 23% by weight based on the total weight of the ink composition; and
(b) two or more hydroxyl compounds each having two or more alcoholic hydroxyl groups per molecule, the ratio of number of alcoholic hydroxyl groups per molecule (N) to molecular weight (M) (N/M) being not less than 0.01, in a total amount of not less than 10% by weight based on the total weight of the ink composition.

As a conventional ink composition comprising a water-soluble resin and a resin emulsion ink composition therein there is disclosed an ink composition adapted to secure both jetting stability and fixability on a recording medium in JP-A-4-18462 and JP-A-5-148441. When printing is effected with such a conventional ink composition on a heated recording medium, a thermoplastic resin in the ink composition is heated to a temperature of not lower than its softening temperature to cause the evaporation of the solvent and the phase transition of the resin, allowing a rapid viscosity rise and hence providing a high quality image. However, in order to prevent malinjection due to thickening of the resin in the head, a large amount of a water-soluble moisture-retaining component is required. If the moisture retention is excessive or the ambient conditions such as humidity and temperature show a change, the image which has been printed can be unevenly dried immediately after printing. Such a defect appears as sticking on the surface of image or milky turbidity, causing an image deterioration.

The inventors have found that when an ink composition for use in ink jet recording system which comprises jetting droplets of the foregoing ink composition through an ink jet recording head so that said droplets are attached to a recording medium, and applying heat to said droplets of ink composition from a platen via the recording medium at the same time with the attachment of the ink droplets so that said droplets of ink composition are fixed comprises (a) a component which stays nonvolatile at the heating temperature of a recording medium in an amount of not less than 23% by weight based on the total weight of the ink composition; and (b) two or more of the foregoing hydroxyl compounds in a total amount of not less than 10% by weight based on the total weight of the ink composition, an ink composition for ink jet recording can be obtained which is insusceptible to maldrying shortly after printing without causing malinjection and can provide a high quality image without being affected by the ambient conditions [hereinafter occasionally referred to as "hydroxyl compound-containing ink composition"].

In the hydroxyl compound-containing ink composition, the component which stays nonvolatile at the heating temperature of the recording medium is incorporated in an amount of not less than 23% by weight, more preferably from 25 to 35% by weight based on the total weight of the ink composition so that the ink composition attached to the heated recording medium can undergo rapid thickening on heating, making it possible to obtain a high quality image. The heating temperature of the recording medium is normally from 80° C. to 120° C. The specific heating temperature used in individual recording methods and the content of nonvolatile components in the hydroxyl compound-containing ink composition used in the recording method can be determined to provide a sufficient thickening rate.

Further, as water-insoluble components in the foregoing nonvolatile component, the pigment and thermoplastic resin emulsion dispersed in water can be incorporated in a total amount of preferably not less than 10% by weight, more preferably from 20% to 50% by weight based on the weight of the nonvolatile component to thicken the ink composition more rapidly. The foregoing nonvolatile component comprises a pigment dispersant incorporated therein besides the pigment and resin components of thermoplastic resin emulsion.

However, if the content of the nonvolatile component or the proportion of solid content is thus raised, the thickening accompanying the temperature rise in the head can cause malinjection. In order to prevent this defect, it is effective to incorporate a moisture-retaining water-soluble component in the ink composition. However, if the kind or content of these components is improper, the image which has been printed can be unevenly dried.

In order to eliminate this problem, it is effective to incorporate in an ink composition comprising water as a main solvent two or more hydroxyl compounds each having two or more alcoholic hydroxyl (—OH) groups per molecule, the content of said alcoholic hydroxyl groups being not less than 0.01 (preferably not less than 0.1) as calculated in terms of the ratio of number of alcoholic hydroxyl groups per molecule (N) to molecular weight (M) (N/M). Further, the hydroxyl compound may preferably comprise a water-soluble high molecular compound such as saccharide and a polyvalent alcohol. In other words, such an ink composition comprising a compound which has a high hydroxyl number and a strong interaction as a water-soluble component in a proper amount can retain a proper moisture retention in the head. At the same time, when the ink composition is attached to the heated recording medium, the two components are dissolved in each other, preventing specific components from being separated and rising to the surface of the printed ink and hence preventing the printed ink from being unevenly dried.

This effect becomes greater when water-soluble components are incorporated in an optimum amount or a thermoplastic resin in an optimum proportion. In other words, the foregoing effect becomes greater when the pigment (A) and the thermoplastic resin emulsion (B) dispersed in the hydroxyl compound-containing ink composition and the water-soluble high molecular compound (C) and the polyvalent alcohol (D) dissolved in water meet the following requirements. The sum of the content of these components (A+B+C+D) should be from 20% to 50% by weight based on the total weight of the ink composition. Further, the weight ratio of the thermoplastic resin emulsion (B), the water-soluble high molecular compound (C) and the polyvalent alcohol (D) (B:C:D) should be 1:0.3 to 1:0.1 to 1.

As two of the foregoing hydroxyl compounds which can be incorporated in the hydroxyl compound-containing ink composition there may be preferably used a water-soluble high molecular compound and a polyvalent alcohol in combination.

As the foregoing water-soluble high molecular compound there may be used at least one compound selected from the group consisting of saccharose, maltitol, maltose, gluconic acid, sorbitol, mannitol, glucose, polyvinyl alcohol, sodium alginate, and polyethylene oxide. As the foregoing polyvalent alcohol there may be used at least one compound selected from the group consisting of glycerin, diglycerin, polyglycerin, ethylene glycol, diethylene glycol, triethylene glycol, dipropylene glycol, hexylene glycol, and 1,2,6-hexanetriol.

The hydroxyl compound-containing ink composition may comprise a surface active agent incorporated therein. Examples of the surface active agent employable herein include anionic surface active agents such as higher aliphatic acid salt, higher alkyldicarboxylic acid salt, higher alcohol sulfuric acid ester salt, higher alkylsulfonic acid salt, alkylbenzenesulfonate, alkylnaphthalenesulfonate, salt of naphthalenesulfonic acid with Na, L, Li or Ca, formalin polycondensate, condensate of higher aliphatic acid with amino acid, dialkylsulfosuccinic acid ester salt, alkylsulfosuccinic acid salt, naphthenic acid salt, alkylethercarboxylic acid salt, acylated peptide, α-olefinsulfonic acid salt, N-acylmethyltaurin, alkylethersulfuric acid salt, secondary higher alcohol ethoxy sulfate, monoglysulfate, alkyletherphosphoric acid salt, alkylphosphoric acid salt, polyoxyethylene alkyl ether sulfuric acid ammonium salt, polyoxyethylene alkyl ether sulfuric acid sodium salt, polyoxyethylene alkyl phenyl ether sulfuric acid ammonium salt, polyoxyethylene alkyl phenyl ether sulfuric acid sodium salt, polyoxyethylene alkylsulfuric acid monoethanolamine, polyoxyethylene alkyl ether phosphoric acid ammonium salt, polyoxyethylene alkyl ether phosphoric acid potassium salt, polyoxyethylene alkyl ether phosphoric acid diethanolamine, sodium alkylnaphthalenesulfonate and sodium laurylsulfate, cationic surface active agents such as aliphatic acid amine salt, quaternary ammonium salt, sulfonium salt and phosphonium salt, amphoteric surface active agents such as carboxybetaine, aminocarboxylate and lecithine, and nonionic surface active agents such as fluorinic surface active agent, silicone surface active agent, polyoxyethylene sorbitan monolaurate, polyoxyethylene sorbitan monostearate, polyoxyethylene alkyl phenyl ether, sorbitan monostearate, acetylene glycol, ethylene oxide adduct of acetylene glycol (acetylene glycol alcohol ethylene oxide), propylethanolamide, polyoxyethylene alkyl ether and polyoxyethylene alkyl phenyl ether. The use of one or more of the foregoing surface active agents makes it possible to allow the image which has been printed to be dried more uniformly, effectively preventing uneven drying.

The content of the surface active agent is preferably from 0.1 to 1% by weight. This is because if the content of the surface active agent exceeds 1% by weight, the resulting ink composition has an increased foamability that can impair the jetting stability thereof.

In accordance with a still further embodiment of the present invention, the present invention concerns an ink composition comprising a compound represented by tie following general formula (I):

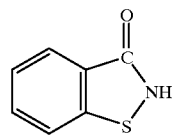

(I)

(i.e., 1,2-benzoisothiazoline-3-one).

An ink composition comprising a pigment and a resin emulsion has excellent properties. On the contrary, however, if the content of solid matter dispersed in water is great, the ink composition is subject to the effect of the environment that causes agglomeration or precipitation of solid matter during storage. Further, since the pigment, resin emulsion and resin dispersant as main components of the ink composition are organic compounds, the generation of mold or microorganism can be hardly avoided. In particular, if the ink composition is brought into contact with air, it is more likely that foreign matters can occur. The agglomeration of solid matter and the generation of foreign matters such as mold and microorganism cause problems such as deterioration of jetting properties of the ink composition. However, if a mildewproofing agent or preservative is added for the purpose of inhibiting the generation of foreign matters, these additives can easily make the dispersion system of ink composition unstable.

The inventors have found that the incorporation of the compound represented by the foregoing general formula (I) makes it possible to solve the foregoing problems. The compound represented by the foregoing general formula (I) is a known compound which can be prepared by a known method per se. Alternatively, a commercial compound may be used. As such a commercial compound there may be used Proxel BDN (aqueous dispersion of the foregoing compound), Proxel CRL, Proxel XL-2 (aqueous solution of the foregoing compound) (available from Zeneca). The content of the compound represented by the foregoing general formula (I) is preferably from 0.0001% to 0.5% by weight, more preferably from 0.005% to 0.1% by weight based on the total weight of the ink composition. If the content of the compound represented by the general formula (I) falls below 0.0001% by weight, the desired effect cannot be exerted. On the contrary, if the content of the compound represented by the general formula (I) exceeds 0.5% by weight, some toxicity can occur.

The ink composition comprising a compound represented by the foregoing general formula (I) can comprise a surface active agent which can be incorporated in the foregoing hydroxyl compound-containing ink composition.

The compound represented by the foregoing general formula (I) may be incorporated in the ink composition in the form of solution, but preferably in the form of dispersion.

In accordance with a still further embodiment of the present invention, the present invention concerns an ink composition comprising the foregoing particular pigment having an average particle diameter of not more than 200 nm and the foregoing thermoplastic resin emulsion comprising a disperse phase component having an average particle diameter of not more than 200 nm.

In a pigment-based ink composition, the pigment must occur in a medium in the form of stable fine dispersion. The ink composition for use in ink jet recording must he jetted through a fine nozzle in the form of droplet. Therefore, the generation of precipitates causes clogging in the nozzle. Accordingly, the ink composition must be insusceptible to the generation of precipitates and be easily freed of precipitates, if any.

As such a pigment-based ink composition there is described an ink composition having a pigment diameter distribution controlled to not more than 0.6 µm and not more than 0.2 µm as an index in JP-A-1-204979. This ink composition allegedly causes no clogging in the nozzle and hence can stably be jetted in the form of ink droplet. Further, JP-A-4-18462 describes an ink composition comprising a pigment and a microemulsion in combination. The above cited patent claims that the average particle diameter of the microemulsion in the ink composition must be not more than 50 nm to effect ink jet recording without clogging.

However, a better ink composition has been still desired. In particular, in order to allow the particulate pigment to stably occur in the ink composition, the particulate pigment must be dispersed to an extremely small particle diameter. If the pigment can be stably dispersed to some particle diameter, the desired ink composition can be easily prepared. An ink image printed on an OHP sheet forms a dark image if its light transmission is low. Thus, an ink composition which can provide an image having a higher light transmission has been desired. Further, an ink composition which can realize an image having a higher gloss has been desired to obtain an image of higher grade.

The inventors have found that when the average particle diameter of pigment is adjusted to not more than 200 nm and the average particle diameter of disperse phase component constituting the foregoing thermoplastic resin emulsion is adjusted to not more than 200 nm as mentioned above, the resulting ink composition of the present invention can exhibit an extremely high light transmission and brightness when printed on an OHP sheet and a high gloss when printed on an ordinary recording paper (hereinafter occasionally referred to as "fine particle-containing ink composition").

The particulate pigment which can be incorporated in the foregoing fine particle-containing ink composition has an average particle diameter of not more than 200 nm, preferably not more than 150 nm, more preferably not more than 100 nm. In the fine particle-containing ink composition of the present invention, the particulate pigment is preferably small. In order to prepare a small particulate pigment, more energy is required. In the fine particle-containing ink composition of the present invention, even the foregoing particulate pigment having an average particle diameter as slightly great as not more than 200 nm can occur stably.

In the fine particle-containing ink composition of the present invention, the pigments as listed above can be used except that the average particle diameter thereof is not more than 200 nm. The content of the pigment is preferably from 0.1 to 10% by weight, more preferably from 0.5 to 5% by weight, as mentioned above.

In the fine particle-containing ink composition of the present invention, the average particle diameter of the resin component (disperse phase component) constituting the thermoplastic resin emulsion is not more than 200 nm, preferably not more than 150 nm, more preferably not more than 100 nm. As such a thermoplastic resin emulsion there may be used the above mentioned thermoplastic resin emulsion as it is.

In the fine particle-containing ink composition of the present invention, the content of the resin emulsion is preferably from 0.2% to 20% by weight, more preferably from 7% to 20% by weight, as mentioned above.

As the thermoplastic resin emulsion to be incorporated in the fine particle-containing ink composition of the present invention there may be preferably used a compound which forms a solid matter or a brittle solid matter without being formed into film when dried at ordinary temperatures but forms a rigid water-resistant film when allowed to cool after being heated to its softening or melting temperature or higher. Further, the lowest film-forming temperature, i.e., the lowest temperature required to form such a rigid water-resistant film is preferably not lower than 60° C., more preferably not lower than 70° C.

The various physical properties of the ink composition of the present invention can be properly controlled. In a preferred embodiment of the present invention, the viscosity of the ink composition is preferably not more than 25 mPa.sec, more preferably not more than 10 mPa.sec at 25° C. If the viscosity of the ink composition of the present invention falls within this range, the ink composition can be stably jetted through an ink jet head. Further, the surface tension of the ink composition can be properly controlled but preferably falls within a range of from 30 to 50 mN/m at 25° C.

The preparation of the ink composition for ink jet recording of the present invention can be accomplished by a process which comprises mixing the foregoing compounding ingredients in an arbitrary order, dissolving and/or dispersing the mixture, and then removing impurities, etc. by filtration. In particular, a process is preferably used which comprises preparing an aqueous pigment dispersion from a pigment, a resin dispersant and water, and then mixing the aqueous pigment dispersion with other compounding ingredients such as thermoplastic resin emulsion.

Further, a pigment may be properly selected, and other compounding ingredients may be properly selected in combination with the pigment thus selected to prepare a yellow ink composition, magenta ink composition, cyan ink composition, black ink composition, blue ink composition, green ink composition or red ink composition for color ink jet recording of the present invention.

The foregoing ink composition of the present invention may be housed in a common ink cartridge which is then mounted in a common ink jet recording apparatus to effect ink jet recording. Further, at least one of a yellow ink composition, a magenta ink composition, a cyan ink composition, a black ink composition, a blue ink composition, a green ink composition and a red ink composition (preferably all the foregoing various color ink compositions) may be housed as an ink composition of the present invention in ink cartridges which are then mounted in a color ink jet recording apparatus to effect color ink jet recording. In some detail, the foregoing ink cartridge in which a magenta ink composition is housed, an ink cartridge in which a yellow ink composition is housed, an ink cartridge in which a cyan ink composition is housed, and optionally an ink cartridge in which a black ink composition is housed may be mounted in combination in the color ink jet recording apparatus to effect color ink jet recording. Alternatively, a magenta ink composition, a yellow ink composition, a cyan ink composition, and optionally a black ink composition may be housed in respective compartments in an ink cartridge which is then mounted in the color ink jet recording apparatus to effect color ink jet recording.

The ink composition of the present invention can be advantageously used in any ink jet recording process. In particular, the ink composition of the present invention can be preferably used in an ink jet recording process which comprises heating a recording medium to fix the ink composition thereon. In other words, if the ink composition of the present invention is used in an ink jet recording process which comprises jetting ink droplets through a printing head onto a heated recording medium to form an ink image, the ink composition which has been attached to the heated recording medium can rapidly thicken on heating to obtain a high quality image.

Accordingly, the present invention also concerns an ink jet recording process which comprises jetting droplets of the foregoing ink composition through an ink jet recording head so that said droplets are attached to a recording medium, and applying heat to said droplets of ink composition from a recording medium support (e.g., platen) via the recording medium at the same time with the attachment of the ink droplets so that said droplets of ink composition are fixed. The heating temperature of the platen is preferably from about 80° C. to 120° C. If the heating temperature of the platen is lower than 80° C., the printed image may be insufficiently dried or fixed. On the contrary, if the heating temperature of the platen is higher than 120° C., excessive energy may be required.

The ink jet recording process of the present invention is not specifically limited so far as one or more of the foregoing ink compositions of the present invention are used. In particular, however, in a color ink jet recording process which is effected with at least two color ink compositions, two or more of the foregoing color ink compositions are preferably used. In other words, the foregoing yellow ink composition, magenta ink composition, cyan ink composition, and optionally a black ink composition may be combined to form an ink set from which a red image, a green image and a blue image are formed. Further, these three color ink compositions may be superposed on each other to form a black image or a separate black ink composition may form a black image to effect a color ink jet recording process. A color ink jet recording process which uses, in addition to the foregoing color ink compositions, a blue ink composition, a green ink composition, and/or a red ink composition to form various color images is also included in the present invention.

EXAMPLES

The present invention will be further described in the following examples, but the present invention should not be construed as being limited thereto. The "parts" and "%" as used hereinafter are by weight unless otherwise specified.

Example 1
(1) Preparation of pigment dispersion 4 parts of a styrene-acrylic acid copolymer resin (weight-average molecular weight=25,000; acid value=200), 2.7 parts of triethanolamine, 0.4 part of isopropyl alcohol, and 72.9 parts of ion-exchanged water were mixed at a temperature of 70° C. to make a complete solution. Subsequently, to the solution were added 20 parts of Carbon Black MA-100 (available from Mitsubishi Kasei Corp.). The mixture was then pre-mixed. The pre-mixture was then subjected to dispersion by means of an Eiger mill (available from Eiger Japan K.K.) until the average particle diameter of the pigment reached 100 nm (bead packing: 70%; medium diameter: 0.7 mm). Thus, a pigment dispersion was obtained.

(2) Preparation of ink composition

The pigment dispersion thus obtained was then used to prepare an ink composition having the following composition.

| | |
|---|---|
| Pigment dispersion as mentioned above | 10 parts |
| Styrene acryl ester emulsion | 15 parts (in solid equivalence) |

| -continued | |
|---|---|
| Diethylene glycol | 3 parts |
| Maltitol | 10 parts (in solid equivalence) |
| Acetylene glycol surface active agent | 0.1 part |
| Anionic surface active agent | 0.3 part |
| Disodium hydrogenphosphate | 0.1 part |
| Ion-exchanged water | 36.5 parts |

The styrene acryl ester emulsion used was an aqueous dispersion having a solid content of 50%, and maltitol used was an aqueous solution having a solid content of 80%. Thus, the amount of these components were given in solid equivalence. As the acetylene glycol surface active agent there was used Surfynol 465 (polyethylene oxide adduct of 2,4,7,9-tetramethyl-5-decyne-4,7-diol available from Nisshin Chemical Industry Co.). As the anionic surface active agent there was used Hitenol N.07 (polyoxyethylene alkyl nonyl phenyl ether).

The foregoing compounding ingredients were mixed to prepare an ink composition. The ink composition thus obtained was then passed through a metal mesh filter (diagonally woven; 2,300 mesh, available from Manabe Kogyo Co., Ltd.) to obtain an ink composition of the present invention of Example 1.

Examples 2 to 20

The procedure of Example 1 was followed to obtain an ink composition for ink jet recording of the present invention except that the compounding ingredients set forth in the following Tables 1 and 2 were used in amounts set forth in Tables 1 and 2. The figure in these tables indicate added amount in % by weight.

| COMPARATIVE EXAMPLE 1 | |
|---|---|
| (1) Preparation of pigment dispersion | |
| Styrene-maleic acid-maleic acid half ester copolymer (acid value = 70; weight-average molecular weight = 12,000) | 4 parts |
| 2-Amino-2-methyl-1-aminopropanol | 2 parts |
| Ion-exchanged water | 74 parts |
| Diethylene glycol | 5 parts |

The foregoing various compounding ingredients were mixed under heating to a temperature of 60° C. to make a complete solution. To the solution were then added 15 parts of carbon black (MCF88, available from Mitsubishi Kasei Corp.). The mixture was then pre-mixed (stirred in a vessel). The pre-mixture was then subjected to dispersion by means of an Eiger mill (available from Eiger Japan K.K.) to obtain a pigment dispersion (bead packing: 70%; medium diameter: 0.7 mm).

(2) Preparation of ink composition

The pigment dispersion thus obtained was then used to prepare an ink composition having the following composition.

| | |
|---|---|
| Pigment dispersion as mentioned above | 30 parts |
| Glycerin | 9 parts |

-continued

| | |
|---|---|
| Diethylene glycol | 4 parts |
| Propanol | 4 parts |
| Acetylene glycol surface active agent | 0.3 part |
| Ion-exchanged water | 52.7 parts |

As the acetylene glycol surface active agent there was used Surfynol 465 (polyethylene oxide adduct of 2,4,7,9-tetramethyl-5-decyne-4,7-diol available from Nisshin Chemical Industry Co.).

The foregoing various compounding ingredients were mixed. 2-Amino-2-methyl-1-propanol was then added to the mixture so that the pH value thereof reached a range of from 8 to 10. The ink composition thus obtained was then passed through a metal mesh filter (diagonally woven; 2,300 mesh, available from Manabe Kogyo Co., Ltd.) to obtain an ink composition of the present invention of Comparative Example 1. The ink composition of Comparative Example 1 thus obtained had almost the same composition as the composition described in JP-A-6-116522.

Comparative Example 2

In Comparative Example 2, an ink composition having almost the same composition as commercial dye-based ink composition for ink jet printer.

| | |
|---|---|
| C.I. Direct Black 19 | 4.0 parts by weight |
| Diethylene glycol | 15.0 parts by weight |
| Ion-exchanged water | 81.0 parts by weight |

Ion-exchanged water and diethylene glycol were mixed with stirring. To the mixture was then added the direct dye (C.I. Direct Black 19) to make a complete solution. The solution was then filtered through a membrane filter to prepare a dye-based ink composition.

Examples 21 and 22

The procedure of Example 1 was followed to prepare an ink composition for ink jet recording of the present invention except that the compounding ingredients set forth in the following Table 3 were used in amounts set forth in Table 3 and the resulting composition was allowed to stand at a temperature of 45° C. in a lean air atmosphere under a pressure of 70 mmHg for 15 minutes. The figure in these tables indicate added amount in % by weight.

Examples 23 to 28

The procedure of Example 1 was followed to prepare an ink composition for ink jet recording of the present invention except that the compounding ingredients set forth in the following Table 4 were used in amounts set forth in Table 4 and 1,2-benzoisothiazoline-3-one represented by the foregoing general formula (I). The figure in these tables indicate added amount in % by weight.

Examples 29 to 32

The procedure of Example 1 was followed to prepare an ink composition for ink jet recording of the present invention except that the compounding ingredients set forth in the following Table 5 were used in amounts set forth in Table 5 and the dispersion time was controlled to adjust the average particle diameter of the pigment as set forth in Table 5. The figure in these tables indicate added amount in % by weight.

Evaluation of properties

The ink compositions of the present invention of Examples 1 to 32 and the ink compositions of Comparative Examples 1 and 2 were evaluated for properties.

(1) Ink jet recording apparatus

The ink jet recording apparatus used in the following evaluation will be described in connection with the drawings.

FIG. 1 illustrates the ink jet recording apparatus used in the evaluation of ink compositions for ink jet recording.

As shown in FIG. 1, the platen 71 of the foregoing recording apparatus acts both as a means of heating a recording medium 75 and a means of carrying the recording medium. The platen 71 is a cylinder made of a metal having a high thermal conductivity (e.g., aluminum). The platen 71 rotates in the direction of arrow when driven by a driving apparatus not shown. The surface of the platen 71 may be composed of a laminate of silicone rubber or the like. Disposed inside the platen 71 is a heater 72 so that the platen 71 can be heated. Paper hold-down rollers 73 and 74 are pressed against the platen 71. The recording medium 75 is inserted between the platen 71 and the paper hold-down rollers 73 and 74. As the platen 71 rotates, the recording medium 75 can be carried. The paper hold-down roller 73 can be prepared by bonding an elastic member (e.g., acrylonitrile rubber) to the surface of a metallic core.

An ink jet recording head 76 is disposed opposed to the platen 71 with the recording medium 75 interposed therebetween. The recording head 76 may use a piezoelectric element or heat energy to form droplets. The recording head 76 may comprise 48 nozzles arranged in an arbitrary matrix. The nozzles of the recording head 76 jet ink droplets according to print data given by a computing unit not shown. Into the recording head 76 is supplied an ink composition from an ink tank 77. The recording head 76 can move in the direction perpendicular to the running direction of the recording medium when driven by a recording head driving apparatus 78.

The ink jet recording is effected as follows. In operation, the recording medium 75 is carried while being clamped between the platen 71 and the paper hold-down roller 73 and 74. While being carried, the recording medium 75 is brought into contact with the platen 71 heated by the heater 72 so that it is heated. Thus, in this embodiment of the apparatus, the surface temperature of the platen 71 is controlled such that the temperature of the recording medium 75 is not lower than the softening temperature of the foregoing thermoplastic resin. Subsequently, ink composition droplets are selectively jetted through the recording head 76 onto the recording medium 75 which is being carried according to print pattern. The ink composition droplets attached to the recording medium 75 are heated and formed into a film to form ink dots. The recording medium is then carried by a predetermined amount by the platen 71 and the paper hold-down rollers 73 and 74. Thus, recording is effected again by means of the recording head 76. In the case where ink dots are juxtaposed with or superposed on each other, printing is preferably effected with a predetermined print interval. Once necessary recording has been finished, the recording medium 75 is discharged out from the apparatus.

In this apparatus, the ink jet recording head and the platen are separated from each other by a distance of about 1.5 mm. The temperature of the ink jet recording head is from about 40° C. to 50° C. The surface temperature of the platen 71 is about 120° C. The surface temperature of the recording medium is from 80° C. to 110° C.

Figure 2:
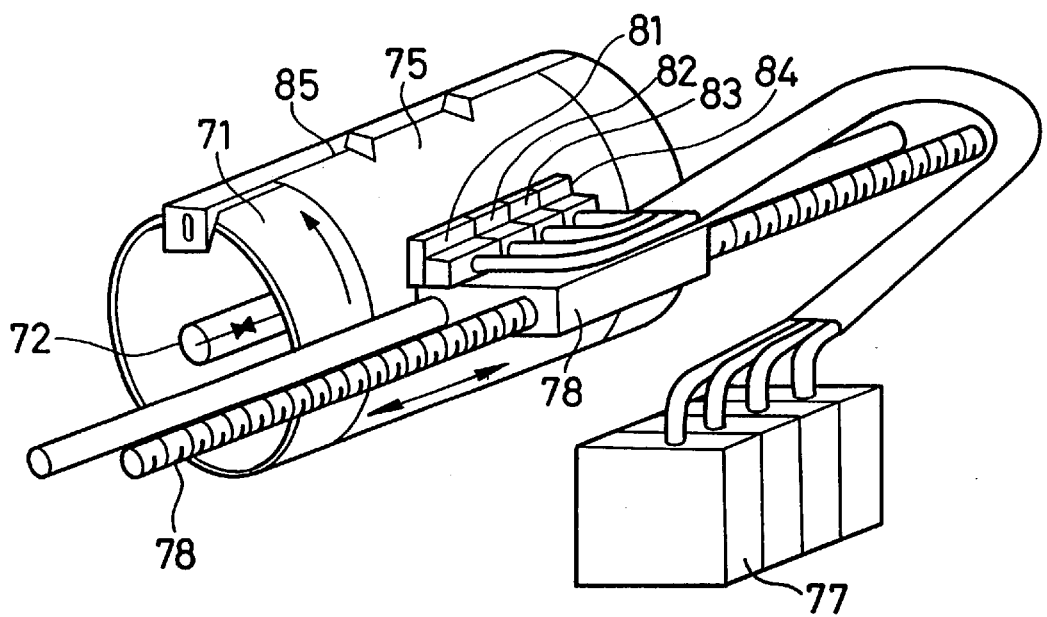
FIG. 2 is a schematic perspective view illustrating another ink jet recording apparatus used in the evaluation of the ink composition for ink jet recording of the present invention.

FIG. 2 illustrates another recording apparatus used in the evaluation of ink compositions. Like numerals are used where the elements are the same as those of FIG. 1. In this apparatus, a recording head is provided for every color ink composition. In other words, recording heads 81, 82, 83 and 84 are recording heads for jetting a black ink composition, a magenta ink composition, a cyan ink composition and a yellow ink composition, respectively. These ink compositions are supplied into these recording heads from the ink tank 77.

Printing by the apparatus of FIG. 2 is basically similar to that by the apparatus of FIG. 1. In other words, the recording medium 75 is wound on the platen 71 by means of a recording medium winding apparatus 85. Subsequently, the recording heads 81 to 84 operate to print on the recording medium at a single line or plural lines. Subsequently, the recording head 78 is moved by a predetermined amount to a point where printing is then effected again at a single line or plural lines. This operation is repeated to record an image on the recording medium 75.

Figure 4:
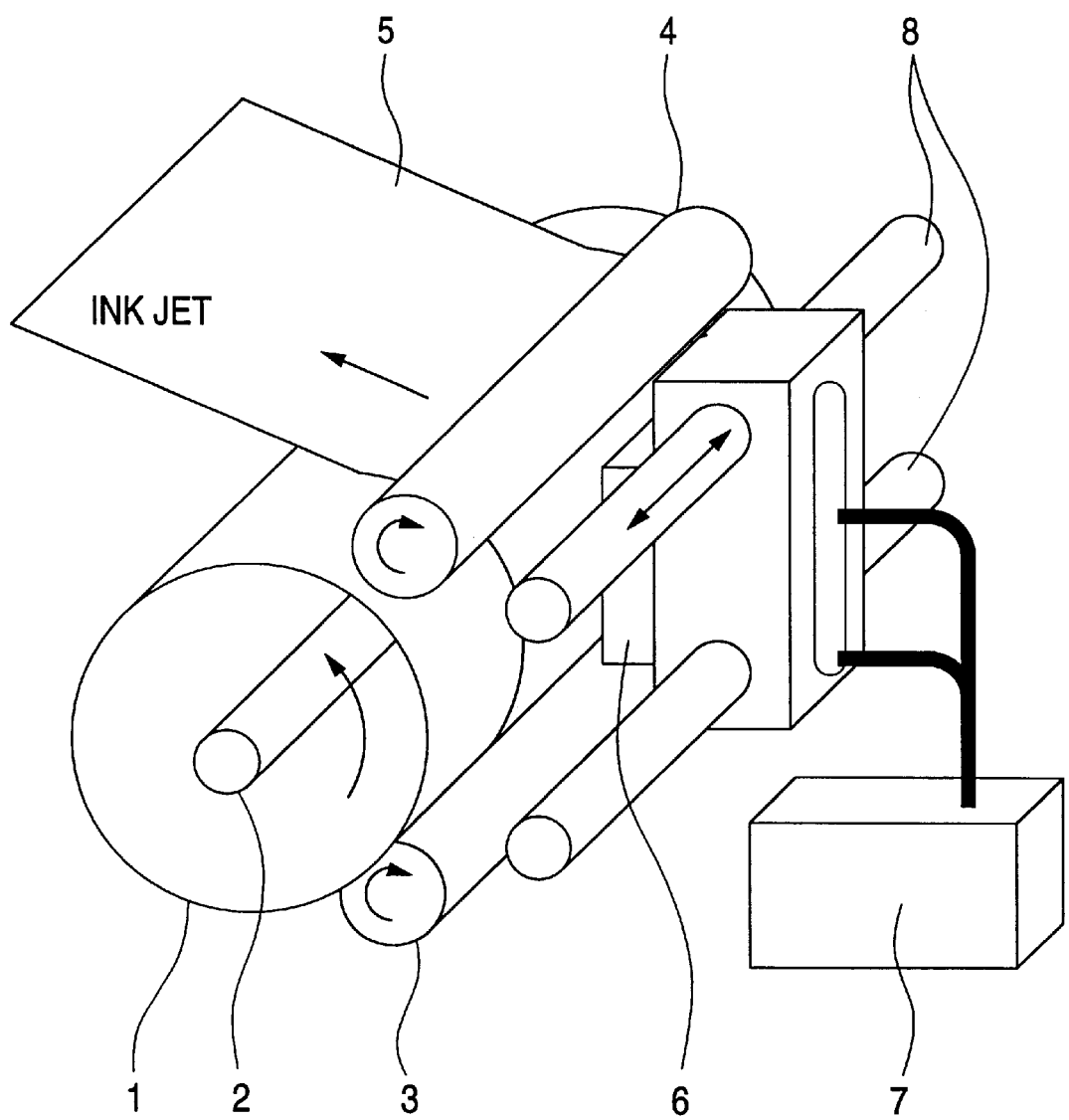
FIG. 4 is a schematic perspective view illustrating a further ink jet recording apparatus used in the evaluation of the ink composition for ink jet recording of the present invention.

FIG. 4 illustrates a still further recording apparatus used in the evaluation of ink compositions. In this apparatus, a platen 1 heats and carries a recording medium 5. The platen 1 is a cylinder made of aluminum. The platen 1 rotates in the direction of arrow when driven by a driving apparatus not shown. The platen 1 has a laminate of silicone rubber formed on the surface thereof. Disposed inside the platen 1 is a heater 2 for heating the platen 1. Paper hold-down rollers 3 and 4 are pressed against the platen 1. A recording medium 5 is inserted between the platen 1 and the paper hold-down rollers 3 and 4. As the platen 1 and the paper hold-down rollers 3 and 4 rotate, the recording medium 5 is carried. The paper hold-down roller 3 is prepared by bonding an acrylonitrile rubber to the surface of a core material made of, e.g., metal. An ink jet recording head 6 is disposed opposed to the platen 1 with the recording medium 5 interposed therebetween. The recording head 6 uses a piezoelectric element to form droplets. The head 6 comprises 48 nozzles arranged in an arbitrary matrix. The nozzles of the recording head 6 jet droplets of ink composition according to print data given by a computing unit not shown. Into the recording head 6 is supplied an ink composition from an ink tank 7. The recording head 6 can move along a guide shaft 8 in the direction perpendicular to the running direction of the recording medium when driven by a recording head driving apparatus not shown.

The ink jet recording is effected as follows. In operation, the recording medium 5 is carried while being clamped between the platen 1 and the rollers 3 and 4. While being carried, the recording medium 5 is brought into contact with the platen 1 heated by the heater 2 so that it is heated. Subsequently, droplets of ink composition are selectively jetted through the recording head 6 onto the recording medium 5 which is being carried according to print pattern. Subsequently, the recording medium is carried by a predetermined amount by the platen 1 and the paper hold-down rollers 3 and 4 to a point where recording is then again effected by the recording head 6. Once necessary recording has been finished, the recording medium 5 is discharged out from the apparatus. In this apparatus, the ink jet recording head 6 and the platen 1 are separated from each other by a distance of about 1 mm. The surface temperature of the platen 1 is controlled to a range of from about 60° C. to 120° C. The surface temperature of the ink jet recording head 6 is from about 30° C. to 80° C.

(2) Evaluation of storage stability of ink composition

For the evaluation of the storage stability of the various ink compositions, these ink compositions were allowed to stand at a temperature of 50° C. in sealed condition for 1 month. The change of properties were then determined. The properties to be evaluated were (a) pH change, (b) viscosity change, and (c) generation of foreign substances. These properties were evaluated in accordance with the following 3-step criterion:

(a) pH change

A (Excellent): No change from initial value

B (Fair): Not more than 5% change from initial value; acceptable

C (Unacceptable): More than 5% change from initial value (b) Viscosity change

For the measurement of viscosity change, a double cylinder type viscometer available from Rheometrics Corp. was used.

A (Excellent): No change from initial value

B (Fair): Not more than 5% change from initial value; acceptable

C (Unacceptable): More than 5% change from initial value (c) Condition of foreign substances A small amount of the ink composition was extracted and put on a slide glass. The specimen was then observed under a microscope (×400). The results were compared with the initial condition.

A (Excellent): No foreign substances generated

B (Fair): Some foreign substances observed but not big enough to cause clogging in the ink composition jetting nozzle C (Unacceptable): Significant foreign substances observed, big enough to cause clogging in the ink composition jetting nozzle (d) Results of evaluation The results of evaluation of Examples 1 to 28 and Comparative Examples 1 and 2 according to the foregoing evaluation criterion are set forth in Tables 6 to 9.

As shown in Tables 6 to 9, the ink compositions for ink jet recording of the present invention of Examples 1 to 28 maintained their initial pH value and viscosity and underwent no generation of foreign substances even after a prolonged storage and thus exhibited an excellent storage stability. On the contrary, the ink composition of Comparative Example 1 showed generation of some foreign substances (acceptable level in practical use). The ink composition of Comparative Example 1 showed a not less than 5% change of pH value and viscosity from the initial value. The ink composition of Comparative Example 2 showed a not more than 5% change of pH value and viscosity from the initial value. Since the ink composition of Comparative Example 2 was a dye-based ink composition, it was not evaluated for the generation of foreign substances.

(3) Evaluation of print quality of ink composition (a) Length of bleeding of monochromatic ink composition Using an ink jet printer having an arrangement shown in FIG. 1, printing was effected on XEROX-R paper (regenerated paper available from XEROX Co., Ltd.), which is relatively subject to ink bleeding among typical commercial papers.

For the evaluation of print quality, printing was effected at a resolution of 300 dpi (dot per inch), an ink jet frequency of 6 KHz and a carriage traveling speed of 510 mm/sec. The recording medium was heated to a temperature of about 100° C. (printer platen temperature: 120° C.). The length of bleeding of ink from printed dot was evaluated in accordance with the following criterion:

A (Excellent): Good quality image can be obtained on regenerated paper even at a resolution as high as greater than 600 dpi (=3 μm);

B (Acceptable): Good quality image can be obtained on regenerated paper at a resolution of from 360 to 600 dpi (=3 to 5 μm);

C (Fair): Good quality image can be obtained on regenerated paper at a resolution of up to 360 dpi (=5 to 10 μm); and D (Unacceptable): Printed ink bleeds to deteriorate image quality definitely at a resolution of not less than 360 dpi (=10 μm)

(b) Length of ink bleeding on multi-color print

Using an ink jet printer having an arrangement shown in FIG. 2, solid printing (100% duty) was effected with the yellow ink composition of Example 7 on a recording paper XEROX 4024 (ordinary paper available from XEROX Co., Ltd.). The black ink composition was printed on the solid-printed area. The printing was effected at a resolution or 600 dpi, an ink jet frequency of 14 KHz and a carriage traveling speed of 590 mm/sec. The distance between the yellow ink composition jetting nozzle and the black ink composition jetting nozzle was 10 mm. The platen temperature was 120° C.

Similarly, the ink compositions of Examples 2 to 20 were evaluated, in combination with other color ink compositions. The following criterion was used.

A (Excellent): Good quality image can be obtained on 4024 paper even at a resolution as high as greater than 600 dpi (=3 μm);

B (Acceptable): Good quality image can be obtained on 4024 paper at a resolution of from 360 to 600 dpi (=3 to 5 μm);

C (Fair): Good quality image can be obtained on 4024 paper at a resolution of up to 360 dpi (=5 to 10 μm); and D (Unacceptable): Printed ink runs to deteriorate image quality definitely at a resolution of not less than 360 dpi (=10 μm)

(c) Results

The results of the evaluation of Examples 1 to 20 and Comparative Examples 1 and 2 according to the foregoing criterion are set forth in Tables 6 and 7.

As shown in Tables 6 and 7, the ink compositions for ink jet recording of the present invention of Examples 1 to 20 showed a bleeding length of not more than 3 μm both in the monochromatic ink bleeding test and the multi-color print ink bleeding test. Thus, these ink compositions can be preferably used as color printer ink.

On the other hand, the ink composition of Comparative Example 1 caused clogging in the recording head because the platen was heated and thus couldn't be properly evaluated.

The ink composition of Comparative Example 2 showed a bleeding length of not less than 10 μm both in the monochromatic and multi-color print ink bleeding test and thus was judged unsuitable for color printer.

(4) Evaluation of redispersibility of ink composition

The ink compositions of Examples 1 to 20 and Comparative Examples 1 and 2 were each dropped onto a slide glass in an amount of 10 μg. The specimen was then allowed to stand in a 40° C. dryer for 1 week so that it was dried. The ink composition having the same composition was then dropped onto the specimen in an amount of 10 μg. A cover glass was then put on the specimen. A finger was then pressed against the cover glass twice or three times. The specimen was then observed under a microscope (×400).

The redispersibility of the dried ink was checked in accordance with the following criterion:

A (Excellent): No agglomerates of ink composition observed;

B (Acceptable): All the ink agglomerates confirmed have a size of not more than 10 μm (Agglomerates having a size of not more than 10 μm, if any, can be discharged from the nozzle of the recording head);

C (Unacceptable): Agglomerates having a size of not less than 10 μm observed

The results of the evaluation of redispersibility of ink composition are set forth in Tables 6 and 7.

As shown in Tables 6 and 7, all the ink compositions for ink jet recording of the present invention of Examples 1 to 20 exhibited good results in the redispersibility test and thus can be sufficiently put into practical use as ink composition for color printer.

On the other hand, the ink composition of Comparative Example 1 was confirmed to have a poor redispersibility. The ink composition of Comparative Example 2 showed a good redispersibility.

(5) Evaluation of effect of inhibiting uneven drying

Solid printing was effected with the ink compositions of Examples 1 to 20 and Comparative Examples 1 and 2 on a regenerated paper and a copying paper. The generation of uneven drying with time immediately after printing was evaluated. For this evaluation, monochromatic images formed by the ink compositions of Examples 1 to 20 and full-color printed pattern formed by superposing the four color ink compositions of Examples 1 to 4 and 9 to 12 were checked. The evaluation was effected in accordance with the following 3-step criterion:

(a) Uneven drying with time after printing

A (Excellent): No uneven drying after printing;

B (Acceptable): Stickiness and milky turbidity disappear after 1 minute of storage; and C (Unacceptable): Stickiness and milky turbidity remain even after 5 minutes of storage (b) Uneven drying due to moisture A (Excellent): No uneven drying at relative humidity of 90% (30° C.);

B (Acceptable): No uneven drying at relative humidity of 60% (30° C.); and

C (Unacceptable): Uneven drying generated at relative humidity of not more than 60% (30° C.)

(c) Results

The results of the evaluation of Examples 1 to 20 and Comparative Examples 1 and 2 according to the foregoing criterion are set forth in Tables 6 and 7.

As shown in Tables 6 and 7, the ink compositions of the present invention of Examples 1 to 20 are insusceptible to poor drying shortly after printing and thus can provide a high quality image without being affected by the environmental conditions.

(6) Evaluation of jetting stability

Using an apparatus shown in FIG. 4, the jetting condition of the ink compositions prepared in Examples 21 and 22 was observed at various head temperatures (25° C., 30° C., 40° C., 60° C., 80° C.). The results were evaluated in accordance with the following 4-step criterion:

A: The difference in discharged amount and discharging rate from 48 nozzles is not more than 10%:

B: The difference in discharged amount and discharging rate from 48 nozzles is more than 10% but not more than 20%;

C: The difference in discharged amount and discharging rate from 48 nozzles exceeds 20%, but 48 nozzles can jet ink; and D: Some of 48 nozzles cannot jet ink (7) Evaluation of light transmission (turbidity)

(a) Preparation of OHP sheet 1

A polyvinylpyrrolidone (PVPK-90, available from GAF) and a styrene-acrylic acid copolymer (AST-7022, available from Nippon Shokubai Co., Ltd.) were mixed in a weight proportion of 10:4.5 to prepare a coating solution. The coating solution thus prepared was applied to a 100-μm thick light transmitting polyethylene terephthalate (PET) film by means of a bar coater to a dry thickness of 5 μm, and then dried at a temperature of from 100° C. to 120° C. for about 20 minutes to obtain an OHP sheet (hereinafter referred to as "OHP sheet 1").

(b) Preparation of OHP sheet 2

A polyvinyl alcohol (PVA-220, available from Kuraray Co., Ltd.) and silica were mixed in a weight proportion of 99.5:0.5 to prepare a coating solution. The coating solution thus prepared was applied to a 100-μm thick light transmitting polyethylene terephthalate (PET) film by means of a bar coater to a dry thickness of 10 μm, and then dried at a temperature of from 100° C. to 120° C. for about 20 minutes to obtain an OHP sheet (hereinafter referred to as "OHP sheet 2").

(c) Printing evaluation test (non-heating)

Printing was effected with the ink compositions of Examples 29 to 32 on OHP sheet 1 and OHP sheet 2 thus obtained. The ink jet printer used in printing was MJ-5000C (Seiko Epson Corporation). The recording medium on which printing had been effected was not heated before being allowed to stand at ordinary temperature.

(d) Printing evaluation test (heating)

The procedure of the printing evaluation test (c) (non-heating) was followed except that printing was effected with the ink composition of Example 31 on OHP sheet 1, followed by the heating of the recording medium at temperatures set forth in Table 10.

(e) Results

For the determination of the light transmittance (haze) of printed matter, haze defined as a proportion of scattered light (Hd) in total transmitted light (Ht) was measured by a hazeometer (NDH-100IDP, available from Nippon Denshoku Kogyo Co., Ltd.). The results are set forth in Table 10.

(8) Evaluation of gloss

Printing was effected with the ink compositions of Examples 29 to 32 on a commercial recording paper (Xerox-4024). The printed area was then measured for gloss according to JIS Z8741 (Method 3 ($\theta$=60°). The results are set forth in Table 10.

TABLE 1

| Ingredient | Examples | | | | | | | |
|---|---|---|---|---|---|---|---|---|
| | 1 | 2 | 3 | 4 | 5 | 6 | 7 | 8 |
| Pigment | | | | | | | | |
| Carbon Black MA-100 | 2 | | | | | 1.5 | | |
| C.I. Pigment Yellow 3 | | | | | | | 1.5 | |
| C.I. Pigment Yellow 17 | | 4 | | | | | | |
| C.I. Pigment Red 168 | | | | | | | | 1.5 |
| C.I. Pigment Red 122 | | | 1.5 | | | | | |
| C.I. Pigment Blue 15:3 | | | | 1.5 | | | | |
| C.I. Pigment Blue 16 | | | | | 1.5 | | | |
| Resin dispersant | | | | | | | | |
| Joncryl 550 (Mw: 7,500; AV: 200) | | 0.2 | | | 0.2 | 0.2 | 0.2 | 0.2 |
| Joncryl 682 (Mw: 1,600; AV: 235) | | | 0.6 | | | | | |
| B-36 (Mw: 1,600; AV: 235) | | | | 0.2 | | | | |
| Styrene-acrylic acid copolymer (Mw: 25,000; AV: 200) | 0.4 | | | | | | | |
| 25% Aqueous ammonia (counter ion) | | 0.05 | | 0.05 | 0.05 | 0.05 | 0.05 | 0.05 |
| Triethanolamine (counter ion) | 0.27 | | 0.48 | 0.16 | | | | |
| Isopropyl alcohol (dissolution aid) | 0.04 | 0.02 | | | | | 0.02 | |
| Disodium hydrogenphosphate (pH buffer) | 0.1 | 0.1 | 0.05 | 0.1 | 0.05 | | | |
| Thermoplastic resin emulsion Styrene-acrylic acid ester copolymer resin emulsion | 15 | 20 | 10 | 15 | 15 | 15 | 15 | 15 |
| Water-soluble high molecular compound Maltitol | 10 | 15 | 20 | 7 | 10 | 10 | 7 | 7 |
| Polyvalent alcohol Diethylene glycol | 3 | 12 | 10 | 17 | 12 | 3 | 12 | 12 |
| Surface active agent | | | | | | | | |
| Acetylene glycol alcohol ethylene oxide | 0.1 | | | | 0.1 | | 0.1 | 1 |
| Ammonium polyoxyethylene alkyl phenyl ethersulfate | 0.3 | | | | | 0.3 | 0.3 | 2 |
| Pure water (ion-exchanged water) | balance | balance | balance | balance | balance | balance | balance | balance |

TABLE 2

| Ingredient | \multicolumn{12}{c}{Examples} | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| Pigment | | | | | | | | | | | | |
| Carbon Black MA-100 | 1.5 | | | | 2 | | | | 2 | | | |
| C.I. Pigment Yellow 3 | | | 1.5 | | | | | | | | 2 | |
| C.I. Pigment Yellow 17 | | | | | | | 2 | | | | | |
| C.I. Pigment Red 168 | | | | 1.5 | | | | 2 | | | | 5 |
| C.I. Pigment Blue 15:3 | | 1.5 | | | | 2 | | | | | | |
| C.I. Pigment Blue 16 | | | | | | | | | | 2 | | |
| Resin dispersant | | | | | | | | | | | | |
| Joncryl 550 (Mw: 7,500; AV: 200) | 0.3 | 0.3 | 0.3 | 0.3 | 0.4 | 0.4 | 0.4 | 0.4 | 0.4 | 0.4 | 0.4 | 1 |
| 25% Aqueous ammonia (counter ion) | 0.08 | 0.68 | 0.08 | 0.08 | 0.1 | 0.1 | 0.1 | 0.1 | 0.1 | 0.1 | 0.1 | 0.25 |
| Thermoplastic resin emulsion | | | | | | | | | | | | |
| Styrene-acrylic acid ester copolymer resin emulsion | 15 | 15 | 15 | 15 | | | | | | | | |
| Polyacrylic acid resin emulsion | | | | | 15 | | 15 | 15 | 15 | | 15 | 15 |
| Polyethylene resin emulsion | | | | | | 7 | | | | 7 | | |
| Water-soluble high molecular compound | | | | | | | | | | | | |
| Maltitol | 10 | 7 | 7 | 7 | | | | | | | | |
| Saccharose | | | | | 10 | 7 | 5 | 5 | | 10 | 2 | 10 |
| Polyvinyl alcohol | | | | | | | | | 10 | | | 10 |
| Polyvalent alcohol | | | | | | | | | | | | |
| Ethylene glycol | | | | | 6 | | | | 6 | | | |
| Diethylene glycol | 3 | 12 | 12 | 12 | | | | 10 | | | | 12 |
| Dipropylene glycol | | | | | | 7 | 2 | | | 10 | 1 | |
| Glycerin | | | | | 6 | | | | 6 | | | |
| Surface active agent | | | | | | | | | | | | |
| Polyoxyethylene sorbitan monolaurate | | | | | | 0.2 | | | | 0.2 | | |
| Acetylene-glycol alcohol ethylene oxide | | 0.1 | 0.1 | 0.1 | | | 0.1 | 0.1 | | | 0.1 | |
| Ammonium polyoxyethylene alkyl phenyl ethersulfate | 0.3 | 0.3 | 0.3 | 0.3 | 0.3 | 0.3 | 0.3 | 0.3 | 0.3 | 0.3 | | |
| Others | | | | | | | | | | | | |
| Ethanol | | | | | | | | | 3 | | | 3 |
| Pure water (ion-exchanged water) | balance | balance | balance | balance | balance | balance | balance | balance | balance | balance | balance | balance |

TABLE 3

| Ingredient | Examples | |
|---|---|---|
| | 21 | 22 |
| Pigment | | |
| Carbon Black MA-100 | 20 | 20 |
| Resin dispersant | | |
| Styrene-acrylic acid copolymer (Mw: 25,000; AV: 200) | 0.4 | 0.4 |
| Triethanolamine (counter ion) | 0.27 | 0.27 |
| Isopropyl alcohol (dissolution aid) | 0.04 | 0.04 |
| Disodium hydrogenphosphate (pH buffer) | 0.1 | 0.1 |
| Thermoplastic resin emulsion | | |
| Styrene acrylic acid ester copolymer resin emulsion | 15 | 15 |
| Water-soluble high molecular compound | | |
| Maltitol | | 10 |
| Diethylene glycol | 12 | 3 |
| Surface active agent | | |
| Acetylene glycol alcohol ethylene oxide | 0.1 | 0.1 |
| Ammonium polyoxyethylene alkyl phenyl ether sulfate | 0.3 | 0.3 |
| Pure water (ion-exchanged water) | balance | balance |
| Dissolved air | 10 ppm | 13 ppm |

TABLE 4

| Ingredient | Examples | | | | | |
|---|---|---|---|---|---|---|
| | 23 | 24 | 25 | 26 | 27 | 28 |
| Pigment | 2.0 | 2.0 | 1.5 | 1.5 | 2.0 | 2.0 |
| Carbon Black MA-100 | | | | | | |
| Resin dispersant | | | | | | |
| Joncryl 550 (Mw: 7,500; AV: 200) | | 0.4 | | 0.3 | | |
| Styrene-acrylic acid copolymer | | | | | | |
| (Mw: 25,000; AV: 200) | 0.4 | | 0.3 | | 0.4 | 0.4 |
| Triethanolamine (counter ion) | 0.27 | 0.27 | 0.3 | | 0.27 | 0.27 |
| Isopropyl alcohol (dissolution aid) | 0.04 | 0.04 | 0.05 | | 0.04 | 0.04 |
| Disodium hydrogenphosphate (pH buffer) | 0.1 | 0.2 | 0.1 | | 0.1 | 0.1 |
| Thermoplastic resin emulsion | 15 | 28 | 10 | 15 | 15 | 15 |
| Styrene-acrylic acid ester copolymer resin emulsion | | | | | | |
| Water-soluble high molecular compound | 10 | 10 | 10 | 10 | 10 | 10 |
| Maltitol | | | | | | |
| Polyvalent alcohol | 3 | 3 | 3 | 3 | 3 | 3 |
| Diethylene glycol | | | | | | |
| Surface active agent | | | | | | |
| Acetylene glycol alcohol ethylene oxide | 0.1 | | | | 0.1 | 0.1 |
| Ammonium polyoxyethylene alkyl phenyl ether sulfate | 0.3 | 0.4 | 0.2 | 0.3 | 0.3 | 0.3 |
| Proxel BDN | 0.05 | 0.1 | 0.0066 | 0.05 | | 0.132 |
| Proxel XL-2 | | | | | 0.003 | |
| Pure water (ion-exchanged water) | balance | balance | balance | balance | balance | balance |

TABLE 5

| Ingredient | Examples | | | |
|---|---|---|---|---|
| | 29 | 30 | 31 | 32 |
| Pigment | | | | |
| C.I. Pigment Blue 15:3 (Average particle diameter: 111 μm) | 1.5 | | | |
| C.I. Pigment Red 122 (Average particle diameter: 135 nm) | | 1.5 | | |
| C.I. Pigment Yellow 3 (Average particle diameter: 141 nm) | | | 1.5 | |
| C.I. Pigment Yellow 17 (Average particle diameter: 180 nm) | | | | 1.5 |
| Resin dispersant | 0.4 | 0.4 | 0.4 | 0.4 |
| Styrene-acrylic acid copolymer (Mw: 25,000; AV: 200) | | | | |
| Thermoplastic resin emulsion | 15 | 15 | 15 | 15 |
| Styrene-acrylic acid ester copolymer resin emulsion (MPT: 82° C.; average particle diameter: 110 nm) | | | | |
| Water-soluble high molecular compound | 7 | 7 | 7 | 7 |
| Maltitol | | | | |
| Polyvalent alcohol | 12 | 12 | 12 | 12 |
| Diethylene glycol | | | | |
| Surface active agent | | | | |
| Acetylene glycol alcohol ethylene oxide | 0.1 | 0.1 | 0.1 | 0.1 |
| Ammonium polyoxyethylene alkyl phenylethersulfate | 0.3 | 0.3 | 0.3 | 0.3 |
| Pure water (ion-exchanged water) | balance | balance | balance | balance |

TABLE 6

| Properties to be evaluated | Examples | | | | | | | |
|---|---|---|---|---|---|---|---|---|
| | 1 | 2 | 3 | 4 | 5 | 6 | 7 | 8 |
| Storage stability | | | | | | | | |
| a. pH change | A | A | A | A | A | A | A | A |
| b. Occurrence of foreign substances | A | A | A | A | A | A | A | A |
| c. Viscosity change | A | A | A | A | A | A | A | A |
| Evaluation of print quality | | | | | | | | |
| a. Bleeding length of monochromatic ink | A | A | A | A | A | A | A | A |
| b. Bleeding length of multicolor print | A | A | A | A | A | A | A | A |
| Redispersibility | A | A | A | A | A | A | A | A |
| Uneven drying with time | B | B | B | B | B | B | B | B |
| Uneven drying due to moisture | B | B | B | B | B | B | B | B |

TABLE 7

| Properties to be evaluated | \multicolumn{14}{c}{Examples} | \multicolumn{2}{c}{Comparative Examples} |
|---|---|---|---|---|---|---|---|---|---|---|---|---|---|---|---|---|
| | 9 | 10 | 11 | 12 | 13 | 14 | 15 | 16 | 17 | 18 | 19 | 20 | 1–4 | 9–12 | 1 | 2 |
| Storage stability | | | | | | | | | | | | | | | | |
| a. pH change | A | A | A | A | A | A | A | A | A | A | A | A | A | A | B–C | B |
| b. Occurrence of foreign substances | A | A | A | A | A | A | A | A | A | A | A | A | A | A | B | — |
| c. Viscosity change | A | A | A | A | A | A | A | A | A | A | A | A | A | A | B–C | B |
| Evaluation of print quality | | | | | | | | | | | | | | | | |
| a. Bleeding length of monochromatic ink | A | A | A | A | A | A | A | A | A | A | A | A | A | A | C | C |
| b. Bleeding length of multicolor print | A | A | A | A | A | A | A | A | A | A | A | A | A | A | C | C |
| Redispersibility | A | A | A | A | A | A | A | A | A | A | A | A | A | A | C | A |
| Uneven drying with time | A | A | A | A | A | A | A | A | B | B | B | B | A | A | C | C |
| Uneven drying due to moisture | A | A | A | A | B | A | A | B | B | B | B | A | A | C | C |

TABLE 8

| Properties to be evaluated | Head temperature | \multicolumn{2}{c}{Examples} |
|---|---|---|---|
| | | 21 | 22 |
| Jetting stability | 25° C. | A | A |
| | 30° C. | A | A |
| | 40° C. | A | A |
| | 60° C. | A | A |
| | 80° C. | A | A |
| Storage stability | pH change | A | A |
| | Occurrence of foreign substances | A | A |
| | Viscosity change | A | B |

TABLE 9

| Properties to be evaluated | \multicolumn{6}{c}{Examples} |
|---|---|---|---|---|---|---|
| | 23 | 24 | 25 | 26 | 27 | 28 |
| Storage stability | | | | | | |
| 1. Occurrence of foreign substances | A | A | A | A | A | A |
| 2. pH change | A | A | A | A | A | A |
| 3. Viscosity change | A | A | A | A | A | A |

TABLE 10

| Properties to be evaluated | \multicolumn{4}{c}{Examples} |
|---|---|---|---|---|
| | 29 | 30 | 31 | 32 |
| Haze (non-heating) | | | | |
| OHP1 | 8 | 10 | 12 | 15 |
| OHP2 | 10 | 14 | 15 | 20 |

TABLE 10-continued

| Properties to be evaluated | \multicolumn{4}{c}{Examples} |
|---|---|---|---|---|
| | 29 | 30 | 31 | 32 |
| Haze (heating) | | | | |
| OHP1 heating temperature | | | | |
| 100° C. | | | 8 | |
| 90° C. | | | 10 | |
| 80° C. | | | 12 | |
| Gloss | 7–8 | 8–9 | 7–8 | 6–7 |

While the invention has been described with reference to specific embodiments thereof, modifications or variations apparent to those skilled in the art are included in the scope of the invention.

What is claimed is:

1. An ink composition for ink jet recording comprising a pigment, a resin dispersant, a thermoplastic resin emulsion, a saccharide and water, wherein the weight ratio of said pigment to said resin dispersant is form 20:1 to 5:2; and further comprising a compound represented by the following general formula (I):

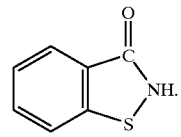

(I)

2. The ink composition according to claim 1, wherein said compound represented by the general formula (I) is present in an amount of from 0.005 to 0.1% by weight.

* * * * *